(No Model.) 4 Sheets—Sheet 2.
G. F. SIMONDS.
BALL BEARING.
No. 466,438. Patented Jan. 5, 1892.
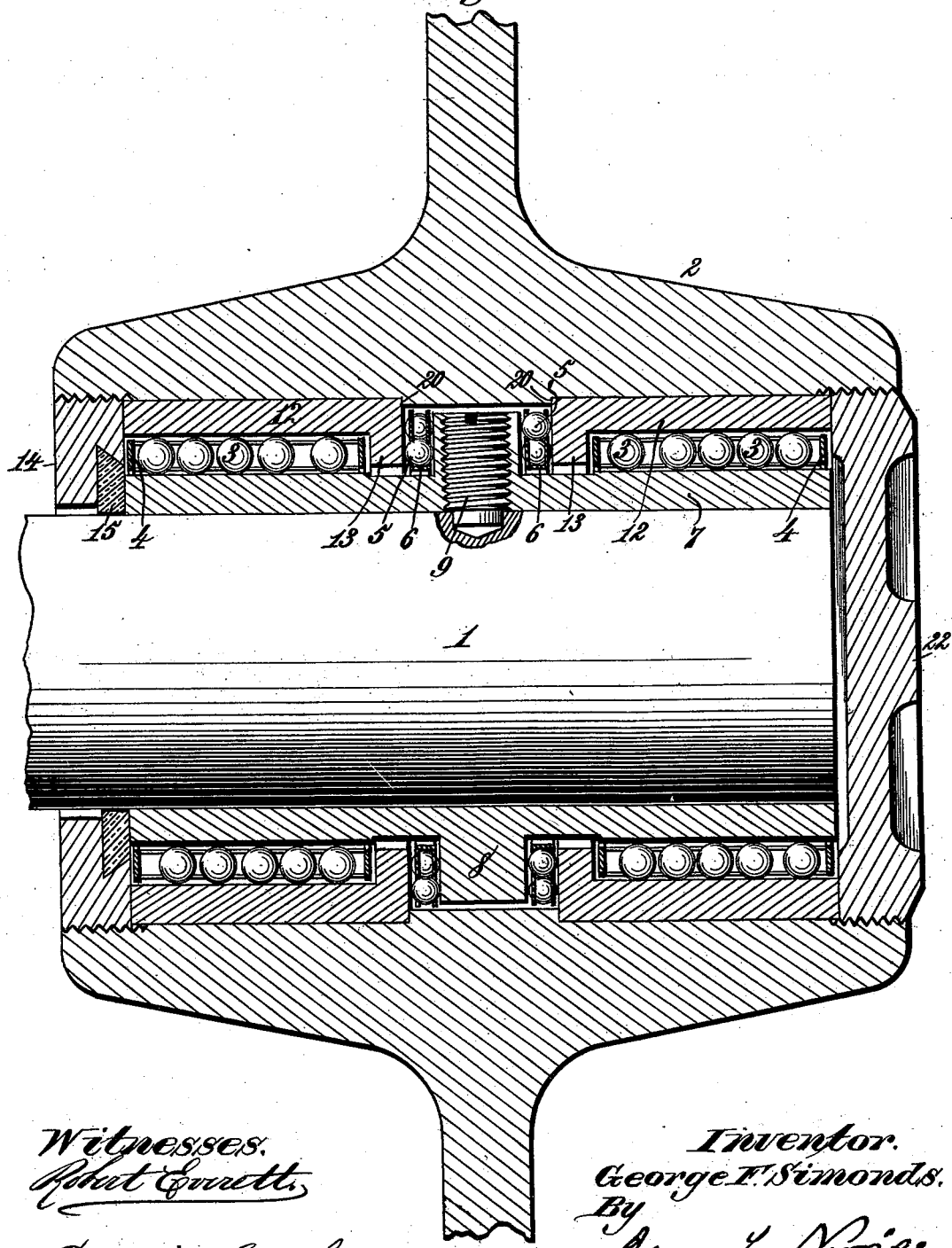
Witnesses.
Robert Everett.
Dennis Sumby.
Inventor.
George F. Simonds.
By
James L. Norris.
Atty.

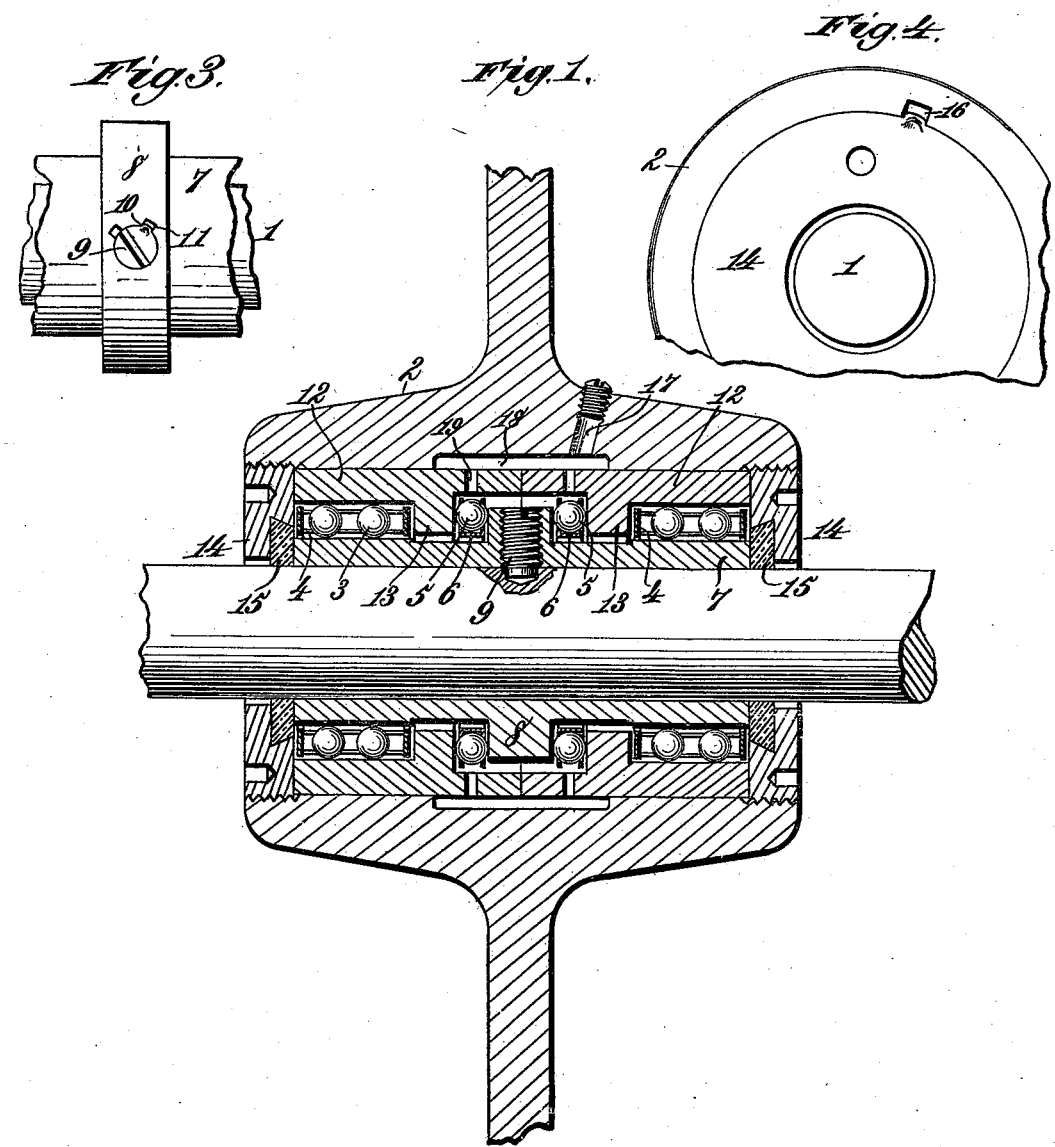

(No Model.) 4 Sheets—Sheet 3.
G. F. SIMONDS.
BALL BEARING.
No. 466,438. Patented Jan. 5, 1892.
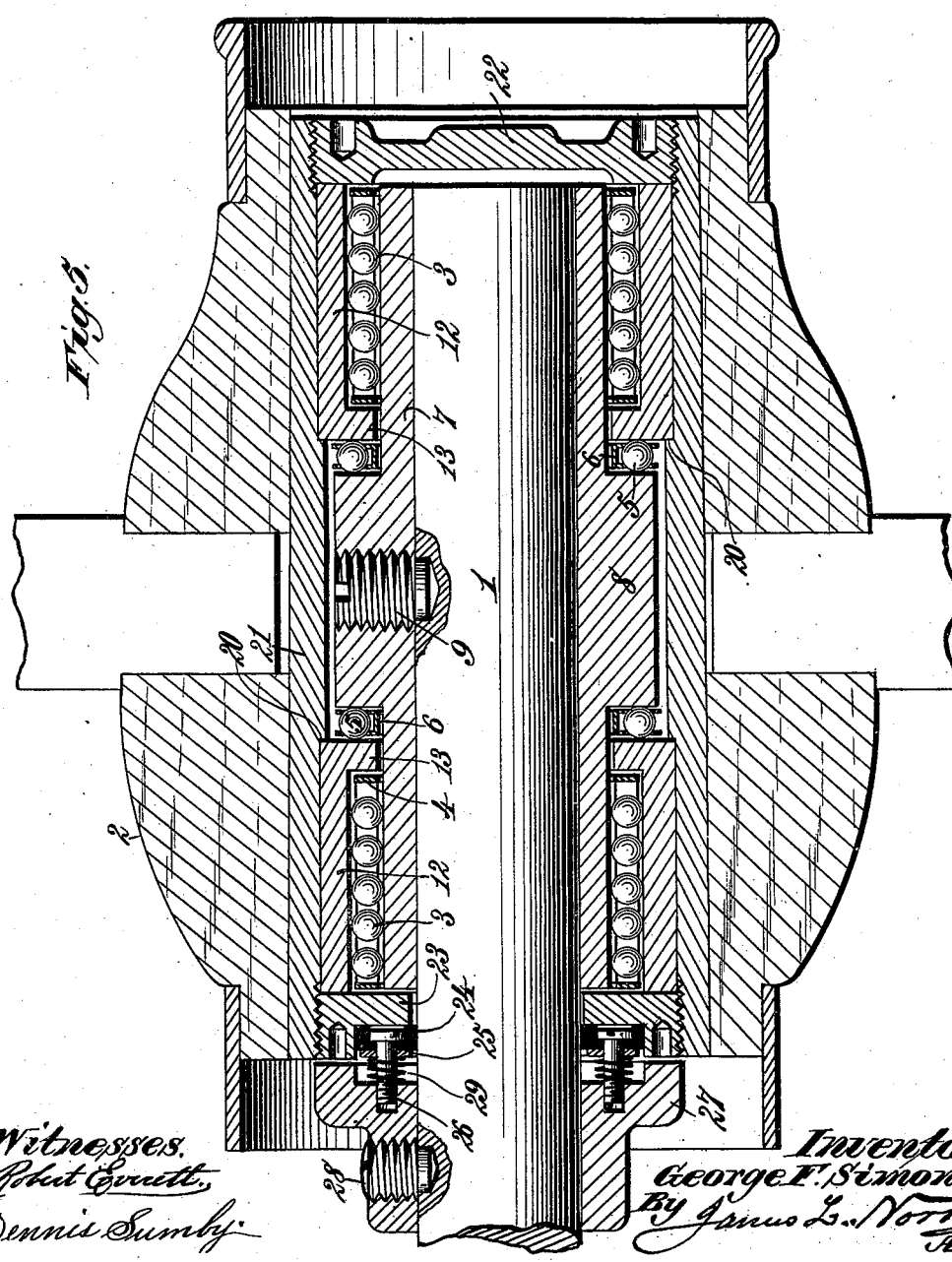
Witnesses.
Robert Everitt,
Dennis Sumby.
Inventor
George F. Simonds.
By James L. Norris.
Atty.

(No Model.) 4 Sheets—Sheet 4.
G. F. SIMONDS.
BALL BEARING.
No. 466,438. Patented Jan. 5, 1892.
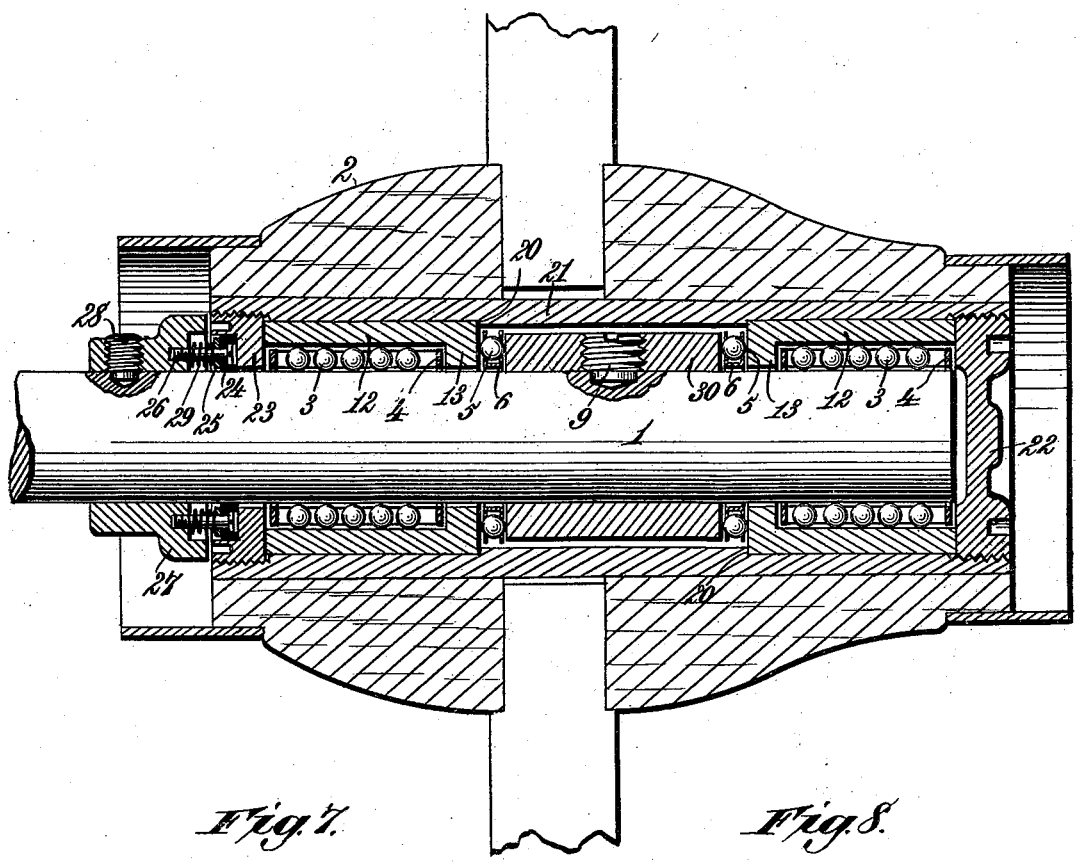
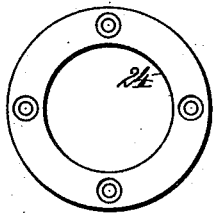
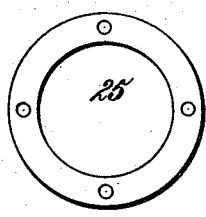
Witnesses.
Robert Everett.
Dennis Sumby.
Inventor.
George F. Simonds.
By James L. Norris.
Atty.

UNITED STATES PATENT OFFICE.

GEORGE F. SIMONDS, OF FITCHBURG, MASSACHUSETTS.

BALL-BEARING.

SPECIFICATION forming part of Letters Patent No. 466,438, dated January 5, 1892.

Application filed April 23, 1891. Serial No. 390,156. (No model.)

*To all whom it may concern:*

Be it known that I, GEORGE FREDERICK SIMONDS, a citizen of the United States, residing at Fitchburg, in the county of Worcester and State of Massachusetts, have invented new and useful Improvements in Ball-Bearings, of which the following is a specification.

This invention relates to ball-bearings of that class in which separate groups or series of spherical rollers or balls are employed to sustain radial pressure and thrust or end pressure for the purpose of diminishing or obviating the effects of friction.

The invention consists in certain improvements in the construction, relative arrangement, and combination of parts in ball-bearings particularly adapted for pulleys, car-wheels, wagons, and other vehicle-wheels and other rotary parts, as hereinafter fully set forth.

In the annexed drawings, Figure 1 is a longitudinal sectional elevation illustrating the application of my improvements to a loose pulley. Fig. 2 is a similar view showing the application of the invention to a car axle and wheel. Fig. 3 is a detail plan view showing a mode of fastening a sleeve or collar to a cylinder shaft or axle. Fig. 4 is a partial end elevation of Fig. 1, showing how a cap may be secured in the hub of a wheel or pulley. Fig. 5 is a longitudinal sectional elevation illustrating an application of my improvements to the hub and axle of a vehicle-wheel. Fig. 6 is a similar view showing the balls for sustaining radial pressure arranged in rolling contact with a hardened cylindrical shaft or axle. Fig. 7 is a plan of a packing-ring. Fig. 8 is a plan of a washer.

Throughout the several figures of the drawings the numeral 1 designates a shaft or axle composed of a plain cylindrical bar of metal that need not have any collar or shoulder formed thereon. In Fig. 1 I have shown a loose pulley or other rotary part 2 mounted on a through-shaft of this description, with balls 3 for sustaining radial pressure confined in annular cages 4, that are freely movable between hardened concentric bearing-surfaces, on and against which said balls are adapted to revolve in all directions, and balls 5 for resisting thrust or end pressure confined in cages 6, that permit said last-named balls to revolve freely in all directions between and in contact with hardened plane bearing-surfaces. On the shaft 1 is secured a sleeve or collar 7, having an external circumferential rib or projection 8 intermediate its ends. This sleeve 7 may be secured on the shaft by means of a screw 9, passed through a suitable threaded orifice in the circumferential rib 8 and tapped into the cylindrical shaft, as shown in Figs. 1, 2, and 5, and, as shown in Fig. 3, the screw 9, after being driven home, may be made fast by upsetting a portion of its head into a recess 10 in the rib 8 in such a manner that the punched or upset portion 11, slightly engaged in the said recess, will prevent the screw from working loose and yet permit it to be withdrawn when required.

The sleeve 7 may form one of the hardened concentric bearing-surfaces for the spherical rollers or balls 3, that sustain radial pressure, the other hardened concentric bearing-surfaces for said balls being furnished by sleeves or tubular pieces 12, substantially L-shaped in longitudinal section, that are inserted and secured in the pulley, wheel, or other rotary part. As shown in Fig. 1, the adjacent ends of the outer sleeves 12 may abut against each other outside of and in line with the circumferential rib 8 of the inner sleeve 7, and the inward-projecting annular ribs 13 of said sleeves 12 will then be located at such a distance from the adjacent ends of the outer sleeves as to afford space between the ribs or inward projections 13 of the outer sleeves 12 and the rib or outward projection 8 of the inner sleeve 7 to receive the cages 6, in which are confined the spherical rollers or balls 5, that roll on and against the hardened plane surfaces of said projections 8 and 13, to resist thrust or end pressure from both directions.

Both ends of the pulley shown in Fig. 1 are closed by annular screw-caps 14, abutting against the outer ends of the sleeves 7 and 12, and the inner faces of these caps may be recessed to receive and carry annular packing-rings 15 of any suitable character to exclude dust and moisture from the bearing. The screw-caps 14 may be readily attached or detached by means of spanner, and when in position they may be secured from working loose by upsetting or punching a portion of the rim of said cap or caps into slight engagement with a recess 16, Fig. 4, in the end of the hub.

In Fig. 1 I have shown the hub of the pulley or other rotary part 2 provided with an inlet-orifice 17 for the introduction of oil or other lubricant into an annular groove 18, formed in an inner face of the hub surrounding the inner ends of the tubular pieces or sleeves 12, which are provided with orifices 19 for passage of the oil to the balls 5, and thence between the annular inward projections 13 and sleeve 7 to the balls 3, the inner sleeve, if desired, being reduced in diameter opposite the projections 13, as shown in Figs. 1 and 2, to afford free passage and circulation for the oil. Similar provision for lubrication may be applied to the construction shown in other figures of the drawings. Ordinarily, however, but little lubrication will be required.

As shown in Figs. 2, 5, and 6, the annular inward projections 13 of the outer tubular pieces or sleeves 12 may be formed directly at the inner ends of said sleeve, and these sleeves, instead of abutting against each other, will then abut against shoulders 20, formed in the hub, as shown in Fig. 2, or in a metal sleeve 21, that may be inserted in the hub, as shown in Figs. 5 and 6.

The construction shown in Fig. 2 is of a heavy character, adapted more particularly for application to car axles and wheels. In this construction the outer end of the bearing may be closed by a heavy cap-plate 22, as shown.

In the construction shown in Figs. 5 and 6, adapted to the wooden hubs of carriage or wagon wheels, a metal sleeve 21 may be inserted in the hub outside the tubular pieces 12 and sleeve 7, against which the balls 3 and 5 act. The opposite ends of this sleeve 21 are internally screw-threaded to receive and engage a cap-plate 22, located at the outer end of the bearing, and an annular cap 23, located at the inner end and surrounding the axle. Both these caps may be screwed into place or removed by means of a spanner. The exterior face of the annular caps 23 may be provided with an annular recess to receive an annular elastic packing 24, Fig. 7, having a metal washer 25, Fig. 8, on its exterior face. This packing 24 and washer 25 are carried or supported by screw-bolts 26, Figs. 5 and 6, secured in a recessed collar 27, detachably fastened to the axle 1 by means of a screw 28, tapped therein. On the screw-bolts 26, between the washer 25 and collar 27 and located in the recessed portion of said collar, are placed spiral springs 29, that are adapted to hold the packing 24 in yielding contact with the caps 23, while the screw-bolts 26 prevent said packing and its washer 25 from turning with said cap 23 as it rotates with the wheel or other rotary part. The elastic annular packing 24 is in close contact with the axle or shaft and effectually excludes dust and moisture from the bearing, so that little or no oiling will be required.

In Fig. 6 I have shown a construction in which the long inner sleeve is omitted, the cylindrical axle 1 being then treated in a suitable manner to provide it with a hardened surface for contact with the balls 3 in the cages 4, while a short sleeve or tubular piece 30 is secured to the axle between the L-shaped tubular pieces 12 by means of a screw 9 in such position that the balls 5 in the cages 6 will have a rolling contact with the ends of said sleeve 30 and the sides of the projections 13 on the sleeves 12 to resist thrust or end pressure from both directions. By omitting the inner sleeve 7 from between the axle and anti-friction balls and hardening the axle to furnish a suitable bearing-surface for said balls, the diameter and weight of the bearing can be reduced to great advantage in certain classes of work.

It will be observed that the caps 14, 22, and 23 are so arranged as to hold the sleeves or tubular pieces 12 in place and at the same time close the ends of the bearing and prevent the entrance of dirt and moisture.

It is obvious that in ball-bearings of this character the described construction and arrangement of the various parts will result in great advantages in the facility with which a plain cylindrical axle or shaft can be employed and the largely-reduced expense incident to the production of a metal axle formed from a straight cylindrical bar without permanent or integral collars or shoulders.

By the employment of a detachable circumferential projection 8 or 30, located between the inner ends of the tubular pieces or sleeves 12 and the arrangement of the detachable caps for holding these sleeves in place and closing the ends of the bearings a large economy is effected in the practical construction of ball-bearings of this character.

All the several and distinct series or groups of spherical rollers or balls for resisting radial pressure or end-thrust are adapted to revolve freely in all directions independent of the respective concentric and plane bearing-surfaces on and against which they roll or act, and said groups of balls, being separately confined or retained in suitable loosely-placed cages and removable in a body therewith, can be handled with great convenience and without difficulty or loss of time in assembling or detaching the various parts of the bearing.

It will be understood, of course, that the shaft 1, instead of being stationary, may be arranged to rotate in bearings having substantially the construction and arrangement herein described as applied to a pulley, wheel, or other rotary part, the operation of the ball-bearings being in both cases the same.

What I claim as my invention is—

1. In a ball-bearing, the combination of a plain cylindrical axle or shaft having a detachable circumferential projection thereon, a pulley or wheel mounted on said shaft or axle, the tubular pieces or sleeves detachably located in said pulley or wheel and provided at or near their adjacent inner ends with annular inward projections located on opposite sides of said detachable circumferential projection, detachable end caps to hold said sleeves or tubular pieces in place and close the ends of the bearing, spherical rollers or balls adapted to revolve freely in all directions between the plane bearing-surfaces of said tubular pieces and intermediate detachable circumferential projection to resist thrust or end pressure from both directions, other spherical rollers or balls adapted to revolve freely in all directions in contact with concentric bearing-surfaces for the purpose of resisting radial pressure, and removable cages that retain said separate sets of balls, substantially as described.

2. In a ball-bearing, the combination of an axle or shaft having a recessed collar detachably secured thereon, an annular packing surrounding the axle or shaft adjacent to said collar, screw-bolts that secure said packing to said collar, spiral springs located on said screw-bolts between the packing and collar, a pulley or wheel having at one end a cap provided with an annular recess to receive said packing, and separate groups of spherical rollers or balls located between said axle or shaft, and said wheel or pulley in position to resist radial pressure and end-thrust, substantially as described.

In testimony whereof I have hereunto set my hand and affixed my seal in presence of two subscribing witnesses.

GEO. F. SIMONDS. [L. S.]

Witnesses:
JAMES L. NORRIS,
JAMES A. RUTHERFORD.